(12) United States Patent
Deng

(10) Patent No.: US 8,014,087 B1
(45) Date of Patent: Sep. 6, 2011

(54) VACUUM LENS HOLDER

(75) Inventor: Ming-Yu Deng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/821,149

(22) Filed: Jun. 23, 2010

(30) Foreign Application Priority Data

Apr. 28, 2010 (CN) .......................... 2010 1 0159411

(51) Int. Cl.
*G02B 7/02* (2006.01)

(52) U.S. Cl. .......................... 359/819; 359/811; 359/818

(58) Field of Classification Search .................. 359/811, 359/812, 818, 819
See application file for complete search history.

(56) References Cited

U.S. PATENT DOCUMENTS 6,977,782 B2 * 12/2005 Maeda et al. ................. 359/819

* cited by examiner

*Primary Examiner* — Alicia M Harrington
(74) *Attorney, Agent, or Firm* — Altis Law Group, Inc.

(57) ABSTRACT

A lens holder comprises a suction part, at least one connecting part, and a transparent plate. The suction part defines a holding groove and a suction groove on two substantially opposite surfaces thereof respectively, and a connecting hole communicates with the holding groove and the suction groove, wherein the holding groove, the suction groove, and the connecting hole are coaxial. The connecting part is positioned on a side of the suction part and defines an air hole communicating with the connecting hole. The transparent plate is shaped corresponding to the holding groove and received in the holding groove.

6 Claims, 4 Drawing Sheets

VACUUM LENS HOLDER

BACKGROUND

1. Technical Field

The present disclosure relates to a lens holder, and particularly, to a lens holder using vacuum to hold objects to be tested.

2. Description of Related Art

Lenses need to be positioned on a holding device to be tested. A conventional holding device usually includes two holding arms facing each other to clamp an object such as a lens. To test of treatment of the optical surfaces of a lens, a lens may have to have holding portions that are used for being clamped by the arms. However, having the holding portions increases the manufacturing cost of the lens. Additionally, the lens may be damaged by the holding arms if clamped too tightly.

Therefore, it is desirable to overcome the above-mentioned limitations.

BRIEF DESCRIPTION OF THE DRAWINGS

Many aspects of the present lens holder should be better understood with reference to the following drawings. The components in the drawings are not necessarily drawn to scale, the emphasis instead being placed upon clearly illustrating the principles of the present lens holder. Moreover, in the drawings, like reference numerals designate corresponding parts throughout the several views.

DETAILED DESCRIPTION

Embodiments of the present lens holder will now be described in detail with reference to the drawings.

Figure 1:
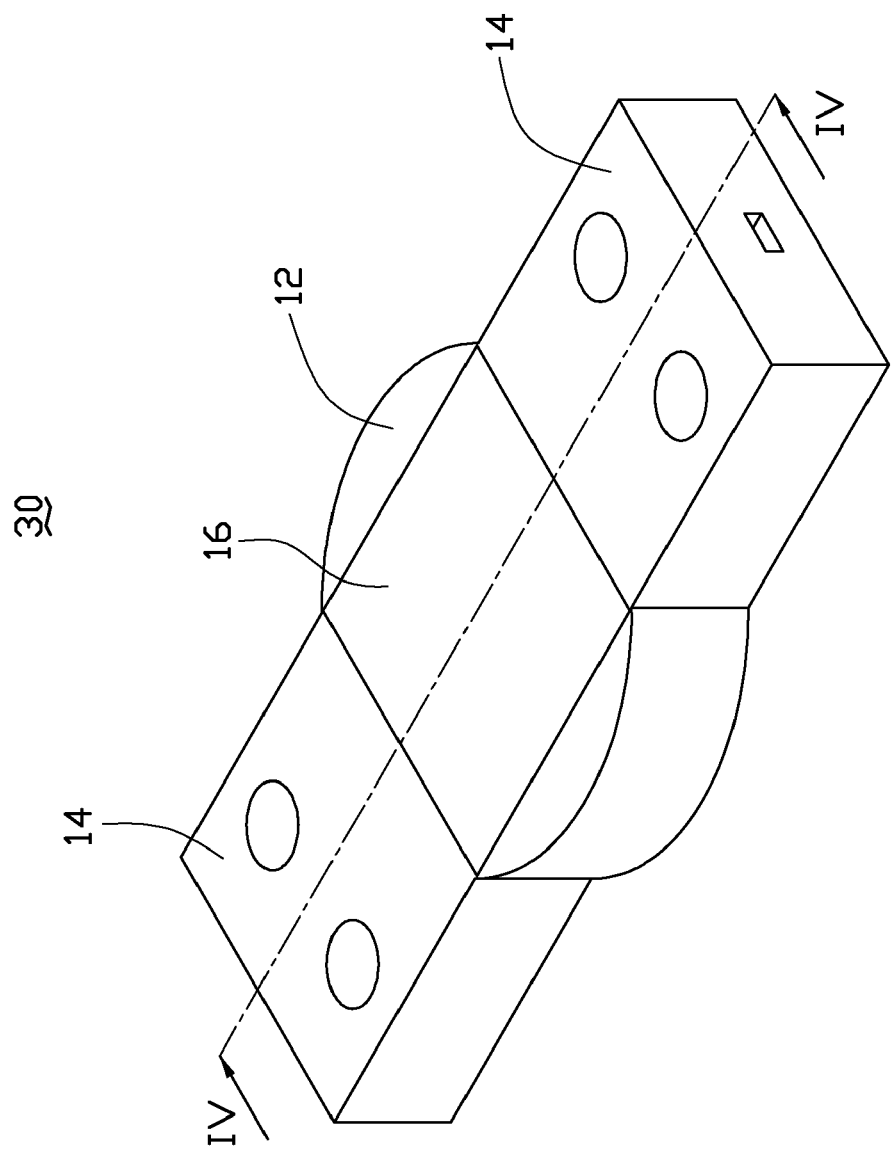
FIG. 1 is an isometric view of a lens holder, according to an exemplary embodiment.
Figure 4:
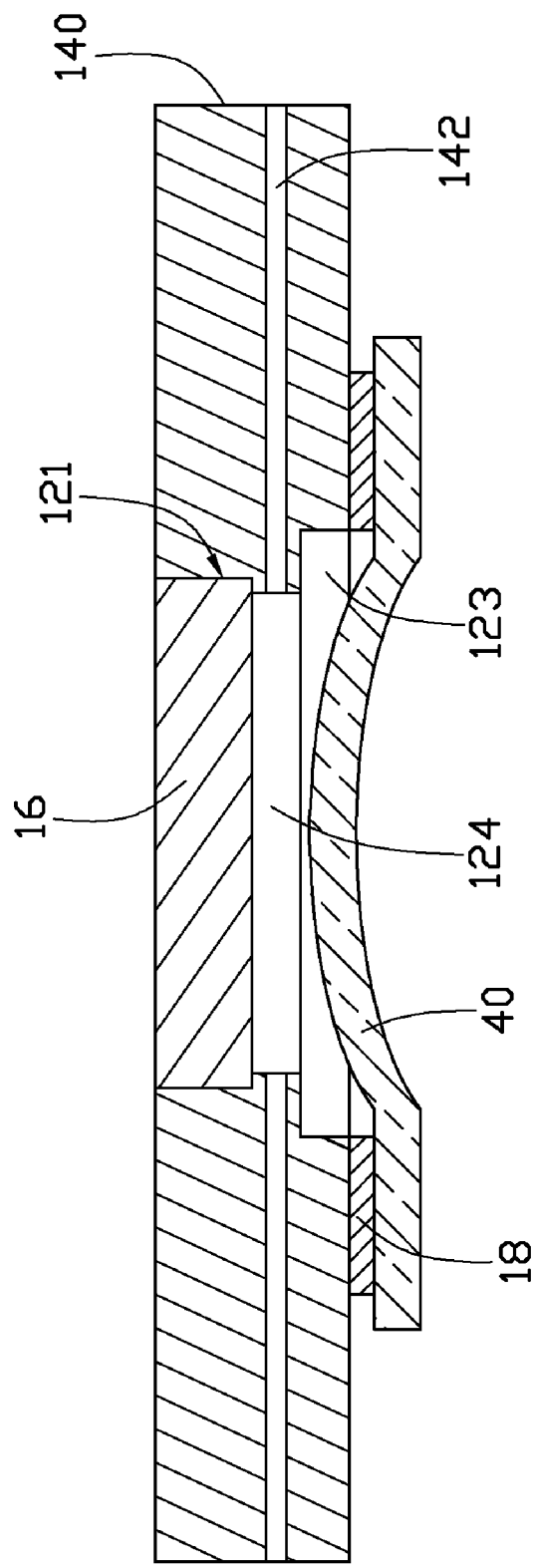
FIG. 4 is a cross sectional view of the lens holder along the line IV-IV of FIG. 1.

Referring to FIG. 1, a lens holder 30 is connected to a vacuum source to fixedly hold a lens 40 (shown in FIG. 4). The lens holder 30, according to one embodiment, includes a suction part 12, two connecting parts 14 positioned on two opposite ends of the suction part 12 correspondingly, a transparent plate 16 made of transparent material such as glass, and a flexible ring 18.

Figure 2:
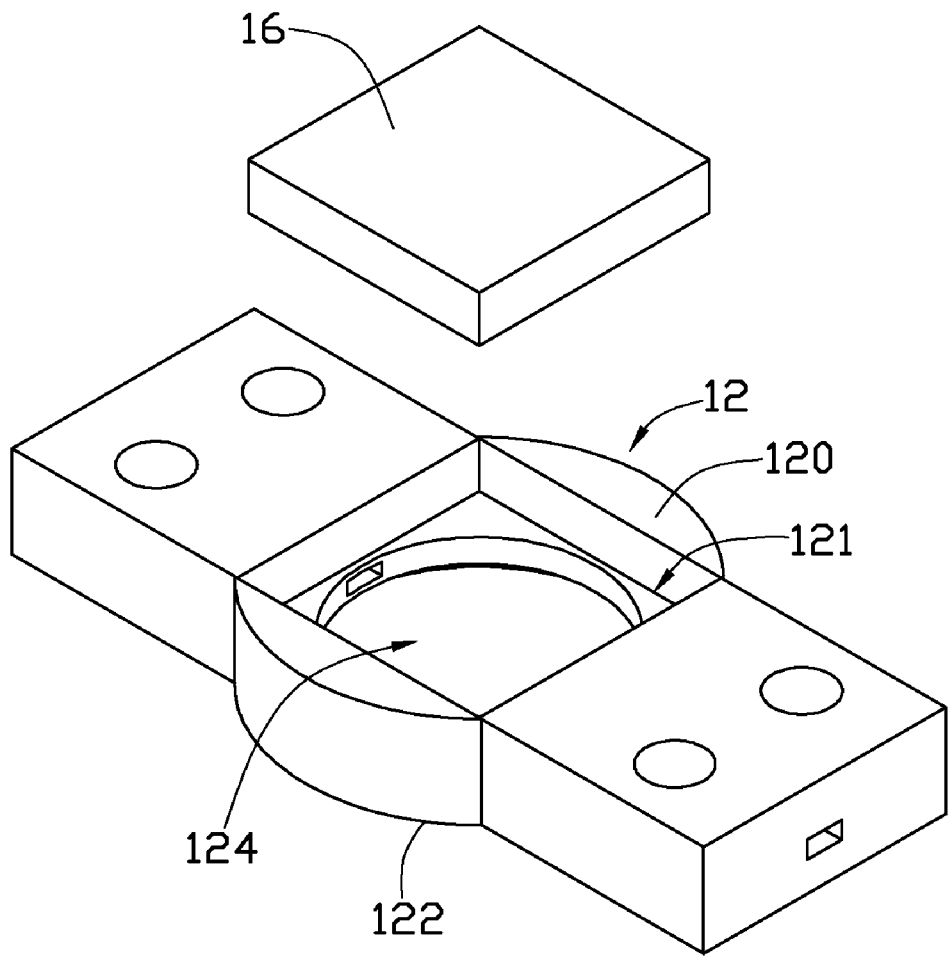
FIG. 2 is an exploded view of the lens holder of FIG. 1.
Figure 3:
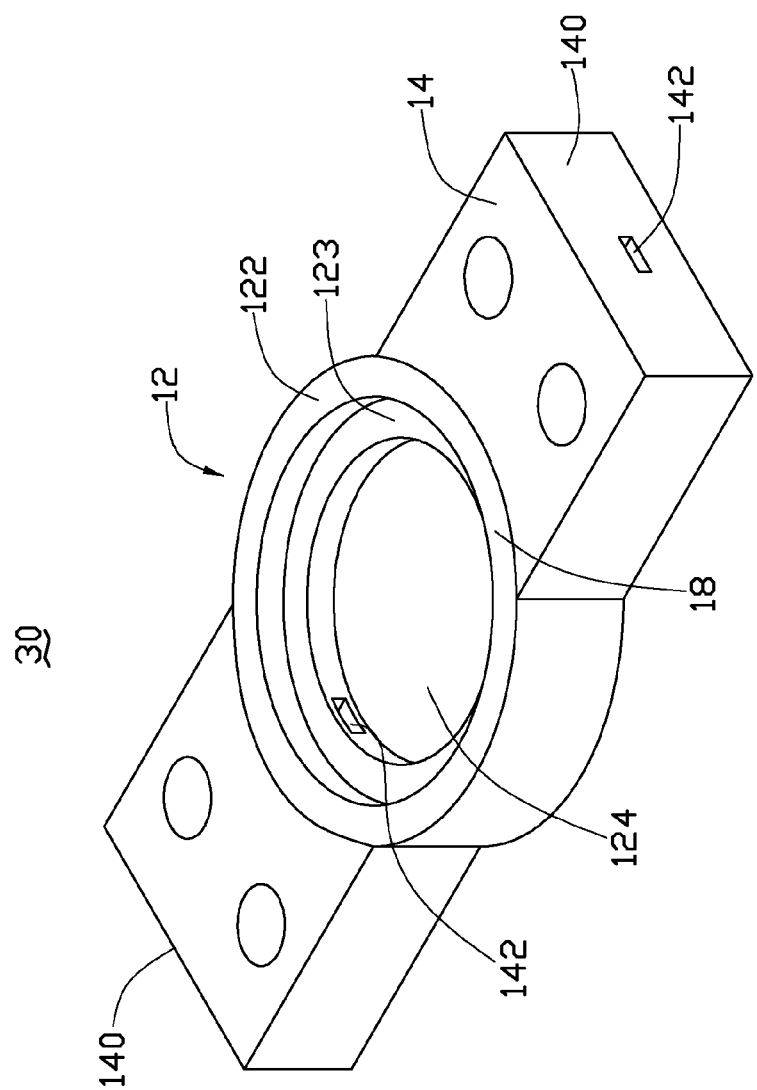
FIG. 3 is another isometric view of the lens holder of FIG. 1.

Referring to FIGS. 2-3, the suction part 12 is circular, and includes a first surface 120 and a second surface 122 opposite to the first surface 120. A rectangular holding groove 121 is defined at the center of the first surface 120. A round suction groove 123 is defined at the center of the second surface 122. A cylindrical connecting hole 124 is defined between the holding groove 121 and the suction groove 123, and communicates with both the holding groove 121 and the suction groove 123. The holding groove 121, the suction groove 123, and the connecting hole 124 are coaxial. The transparent plate 16 is shaped corresponding to the holding groove 121 and can be received in the holding groove 121, so as to seal one end of the connecting hole 124.

Referring to FIGS. 3-4, each connecting part 14 is roughly saddle shaped, and includes a connecting surface 140 facing away from the suction part 12. The connecting surface 140 defines an air hole 142 extending from the connecting surface 140 and communicating with the connecting hole 124.

The flexible ring 18 made of plastic material is disposed around the suction groove 123 on the second surface 122, providing a cushion to the lens 40.

In operation, the two air holes 142 connect to a vacuum source (not shown), the transparent plate 16 seals one end of the connecting hole 124, so that the lens holder 30 is able to suck the lens 40 and hold it in the suction groove 123. As such, the lens 40 can be held by the lens holder 30 without the need for holding portions. The manufacturing cost of the lens 40 is therefore reduced. The lens 40 can be held to be tested as lights can run through the transparent plate 16. Furthermore, vacuum area is formed in the suction groove 123 to hold the lens 40, forming a sealed area that contains little or no dust, therefore test accuracy can be improved.

In another alternative embodiment, only one of the connecting parts 14 is employed and the other of the connecting parts 14 is omitted. In still another embodiment, more connecting parts 14, such as four, are employed and positioned surrounding the suction part 12.

In another alternative embodiment, one of the two air holes 142 can be omitted when a strong enough vacuum can be provided so that the lens can still be firmly held by the lens holder 30. In still another alternative embodiment, the air hole 142 can be defined in any other surface of the connecting part 14 away from the suction part 12.

In other alternative embodiments, the flexible ring 18 can be omitted.

It will be understood that the above particular embodiments is shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A lens holder comprising:
a suction part defining a first surface and a second surface opposing the first surface, wherein the suction part defines a holding groove on the first surface, a suction groove on the second surface, and a connecting hole communicating with both the holding groove and the suction groove, the holding groove, the suction groove, and the connecting hole are coaxial;
at least one connecting part positioned on a end of the suction part and defining an air hole communicating with the connecting hole;
a transparent plate shaped corresponding to the holding groove and received in the holding groove.

2. The lens holder of claim 1, wherein the connecting part includes a connecting surface facing away from the suction part, and the air hole extends from the connecting surface and communicates with the connecting hole.

3. The lens holder of claim 1, wherein a flexible ring is disposed around the suction groove.

4. The lens holder of claim 1, wherein the suction part is circular, and the connecting part is roughly saddle shaped.

5. The lens holder of claim 1, wherein the holding groove is rectangular, the suction groove is round, and the connecting hole is cylindrical.

6. The lens holder of claim 1, wherein number of the at least one connecting part is two and positioned on the two opposite ends of the suction part.

* * * * *